ps://United States Patent Office 3,101,868
Patented Aug. 27, 1963

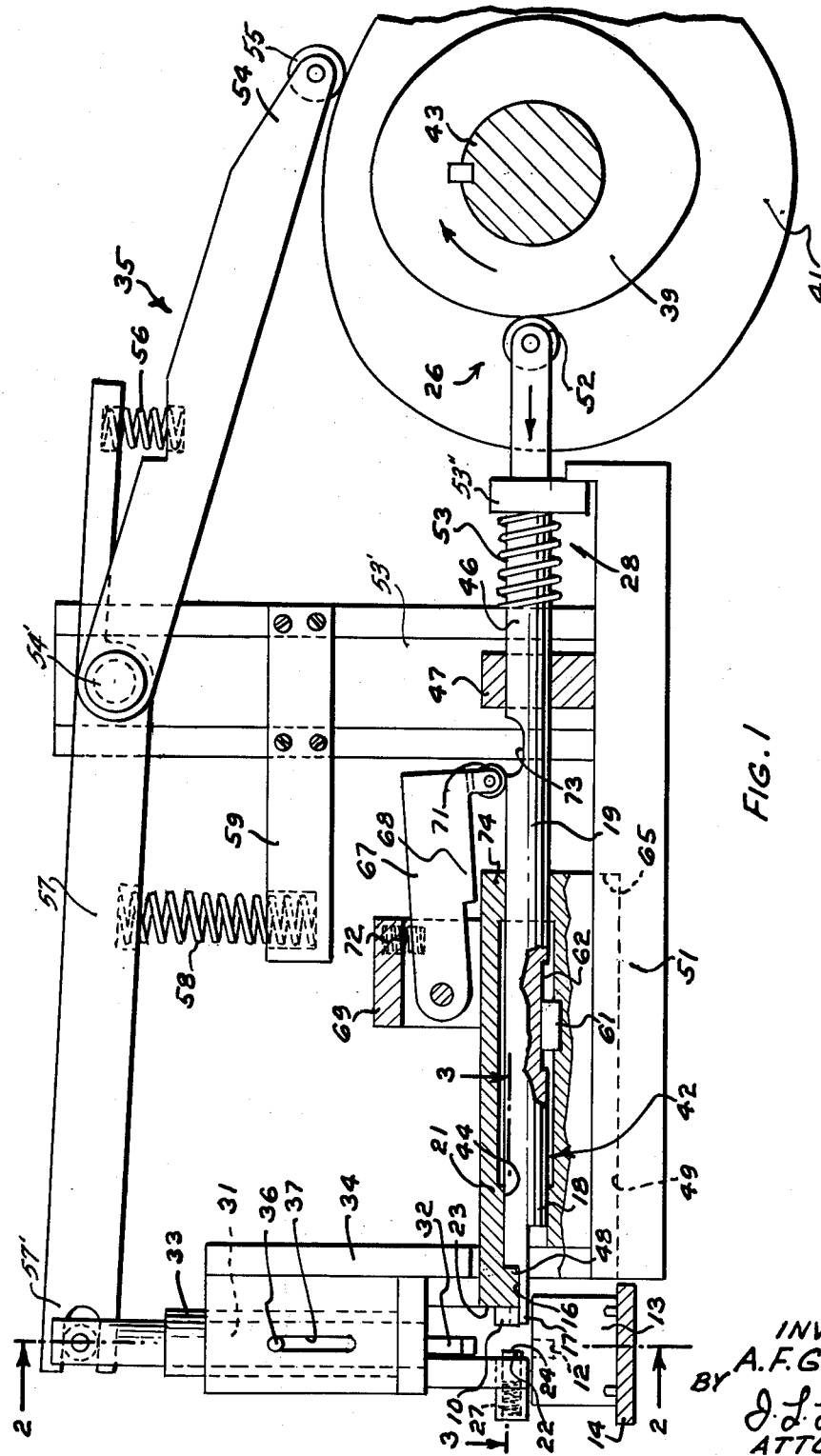

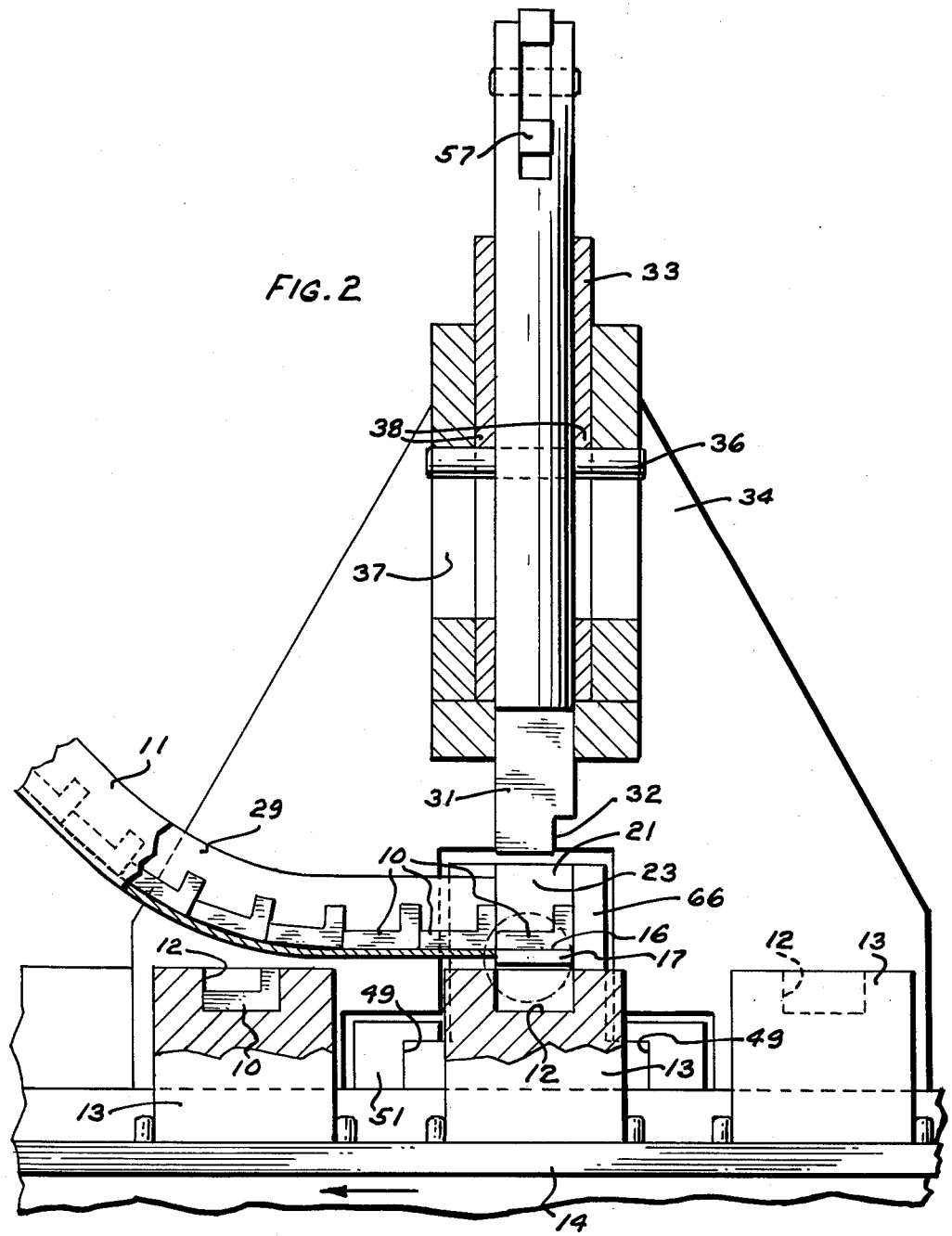

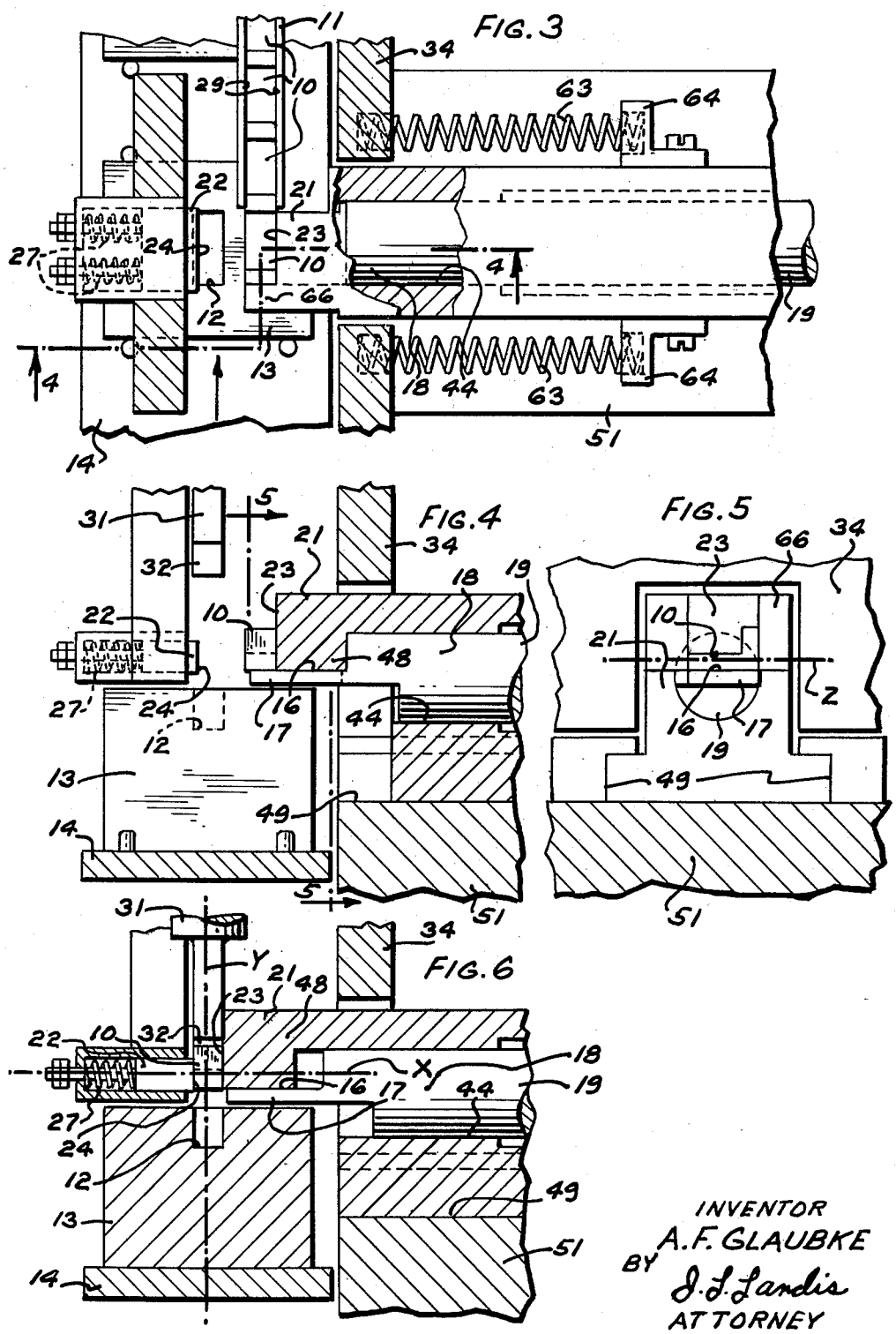

3,101,868
APPARATUS FOR INSERTING A SUCCESSION OF ARTICLES IN ORIENTED RELATIONSHIP INTO ARTICLE-RECEIVING SEATS IN A CARRIER
Allen F. Glaubke, Indianapolis, Ind., assignor to Western Electric Company, Incorporated, New York, N.Y., a corporation of New York
Filed Dec. 14, 1961, Ser. No. 159,335
7 Claims. (Cl. 221—225)

The present invention relates generally to apparatus for dispensing an article onto a carrier, and more particularly to apparatus for inserting a succession of articles in oriented relationship into article-receiving seats in a carrier. Accordingly, the general objects of the invention are to provide new and improved apparatus of such character.

In various automatic assembling operations, it is required that a succession of articles be inserted into apertures or receiving seats in an intermittently advancing carrier, such as a work holder, nest or subassembly on a conveyor. If such articles or piece parts are nonsymmetrical in configuration, it is further required that the articles be oriented in a particular position relative to the associated receiving seats when inserted therein, since the receiving seats are generally of the same configuration and only slightly larger in size. Such close-fitting seats prohibit the insertion of nonsymmetrical articles by mere gravity free-fall, because the articles tend to tumble or otherwise become misoriented as they fall and are therefore not properly received in the seats.

Therefore, a further object of the invention is to provide new and improved apparatus for inserting a succession of nonsymmetrical articles in precisely oriented relationship into article-receiving seats in an intermittently advancing carrier, so that the articles are accurately oriented in the seats in proper position for subsequent assembling operations.

Still another object of the invention is to provide new and improved article-inserting apparatus wherein each article is initially oriented relative to a receiving seat and wherein the oriented position is maintained until after the article has been pushed into the seat to a depth such that misorientation does not thereafter occur.

With the foregoing and other objects in mind, an apparatus in accordance with certain aspects of the invention includes a horizontally movable shelf for supporting an article in a proper orientation and a pair of opposed gripping jaws, the jaws being initially spaced apart above the shelf to permit reception of the article thereon between the jaws. Means are provided for advancing the shelf so that the article is supported on the shelf in a position above a carrier, and further, means are provided for effecting relative movement of the jaws toward each other to grip the article in such position. The shelf is then retracted by another mechanism such that the gripped article is held solely by the jaws a short distance above a carrier in a properly oriented position relative thereto. A mechanism is also provided for pushing the gripped article downward out of engagement with the gripping jaws, which yield so that the article is placed by the pushing mechanism onto the carrier.

According to certain aspects of the invention, the jaws are provided with article engaging surfaces designed to maintain the oriented position of the article until the article has been received in an article-receiving seat in a carrier to a depth such that misorientation does not thereafter occur.

Preferably, the lower surface of the pushing mechanism, or plunger, is provided with a contour which mates with that of the upper portions of the article to cooperate with the jaws in maintaining the orientation of the article. In addition, an especially compact and advantageous unit is provided by providing a special lost-motion coupling between one of the gripping jaws and the shelf, through which that jaw advances and retracts with the shelf after prescribed movements of the shelf alone by a single operating cam.

Other objects, advantages, and aspects of the invention will appear from the following detailed description of a specific embodiment thereof, when taken in conjunction with the appended drawings, in which:

FIG. 1 is a front view, partly in section, of a preferred apparatus for inserting a succession of nonsymmetrical articles in oriented relationship into article-receiving seats in a carrier;

FIG. 2 is an enlarged sectional view taken generally along the line 2—2 of FIG. 1, with portions of the carrier broken away to reveal details in the construction of the article-inserting apparatus;

FIG. 3 is an enlarged, fragmentary sectional view taken generally along the line 3—3 of FIG. 1, with portions broken away to reveal other details in the construction of the apparatus;

FIG. 4 is a fragmentary sectional view taken generally along the line 4—4 in FIG. 3, in which attention is focused on the cooperative article-inserting elements;

FIG. 5 is a fragmentary sectional view taken generally along the line 4—4 in FIG. 4; and FIG. 6 is a fragmentary sectional view of the apparatus, generally similar to FIG. 4 but depicting the relative positions of the jaws with an article suspended therebetween, the shelf, the plunger, and the carrier.

Referring now in detail to the drawings and particularly to FIG. 2, there is illustrated one specific embodiment of the invention in which a succession of nonsymmetrical articles 10—10, specifically L-shaped mounting brackets for an armature and clapper assembly of a telephone set, are received from a gravity chute 11 and are to be inserted in oriented relationship into close-fitting article-receiving seats 12—12 in a carrier 13 on an intermittently advancing conveyor 14. The articles 10—10 from the chute 11 are received and supported, one at a time, on an upper surface 16 of a shelf 17 formed at one end 18 of a cylindrical rod 19 shown in FIGS. 1 and 5. A pair of opposed gripping jaws 21 and 22 are initially sufficiently spaced apart, in the positions shown in FIGS. 1, 3, and 4, as to permit reception of each successive article 10 on the shelf 17 between opposed parallel gripping surfaces 23 and 24 of the jaws 21 and 22.

The jaws 21 and 22 grip the article 10 supported on the shelf 17 from opposite sides as the jaw 21 is advanced with the shelf 17 and the article 10 toward the jaw 22 (to the left from the position shown in FIGS. 1, 3, and 4 to that shown in FIG. 6) by a mechanism 26. The advancement of the jaw 21 forces the article 10 against the jaw 22, depressing a pair of mounting springs 27—27 therefor, so that the article 10 is resiliently gripped between the jaws 21 and 22. The shelf 17 is then retracted (to the right as viewed in FIG. 1) from beneath the gripped article 10 by a mechanism 28, so that the article 10 is no longer supported by the shelf 17 and is held solely by the jaws 21 and 22 a short distance above the article-receiving seat 12 in the carrier 13.

The successive articles 10—10 are constrained by the walls 29—29 of the chute 11 so that they are received on the shelf 17 in a properly oriented position relative to the associated receiving seat 12 as shown in FIG. 2. Consequently, as the jaw 21 and the shelf 17 are advanced, the article 10 is resiliently gripped between the opposed parallel gripping surfaces 23 and 24 in that properly oriented position. Thus, when the shelf 17 is retracted, the gripped article 10 is suspended by the jaws 21 and 22 (FIG. 6) in vertical alignment with the associated receiving seat 12 in the properly oriented position relative thereto.

A plunger 31, having a lower end 32 of mating contour with respect to the upper portions of the gripped article 10 exposed thereto, as depicted in FIG. 2, is slidably mounted in a sleeve 33 supported on a standard 34 above the jaws 21 and 22 in vertical alignment with the gripped article 10 and thus the seat 12 associated therewith. As a plunger-operating mechanism 35 is actuated, the plunger 31 is lowered, being guided by a pin 36 received in a closed slot 37 in opposite walls 38—38 of the sleeve 33, to accurately engage the gripped article 10 with the lower end 32 thereof, to slide the article 10 between the opposed parallel surfaces 23 and 24, and to insert the article 10 into the receiving seat 12.

The opposed parallel surfaces 23 and 24 of the jaws 21 and 22 cooperate with the article-mating contour of the lower end 32 of the plunger 31 to maintain the properly oriented position of the article 10 until the article 10 has been received in the seat 12 to a depth such that misorientation does not thereafter occur. That is, the contour of the lower end 32 of the plunger 31 maintains the oriented position of the article 10 with respect to a first horizontal axis X (FIG. 6) through the jaws, and the parallel gripping surfaces 23 and 24 maintain the oriented position with respect to a vertical axis Y through the plunger 31 (shown in FIG. 6) and with respect to a second horizontal axis Z (FIG. 5) perpendicular to both the X and Y axes. After the article 10 has been received in the associated receiving seat 12, the plunger 31, the shelf 17, and the jaw 21 are returned to their initial positions, and the conveyor 14 is advanced to the left, as viewed in FIG. 2, to present a carrier 13 with a vacant seat 12 to the article-inserting apparatus.

While various timing mechanisms could be utilized in controlling the sequence of operation of the apparatus, a unique combination of two cams 39 and 41 and a lost-motion coupling 42 is utilized in this specific embodiment. Such a combination enables a single drive shaft 43 to actuate the jaw-and-shelf-advancing mechanism 26, the shelf-retracting mechanism 28, and the article-pushing mechanism 35 through the prescribed distances and in the proper sequence of time.

In accordance with that combination, the rod 19 is slidably received at one end in a bore 44 extending longitudinally through the jaw 21 and at its remote end 46 in a fixed bushing 47. As shown in FIG. 1, a lip 48, defined at the left end of the bore 44, abuts the end 18 of the rod 19 adjacent to the shelf 17 at the start of the operation. To render the jaw 21 movable, the lower portion thereof is slidably accommodated in a guideway 49 (FIG. 2) channeled in a fixed support 51. As the shaft 43 is rotated, in a clockwise direction as viewed in FIG. 1, the cam 39 advances the rod 19, together with the jaw 21, to the left through a cam follower 52 being resiliently biased into contact with the cam 39 by a spring 53 compressed between a fixed support standard 53' and a block 53" secured to the rod 19.

Thus, with the article 10 received on the shelf 17, the cam follower 52 transmits to the rod 19 translational motion imparted thereto by the cam 39 to advance both the rod 19 and the jaw 21, because of the engagement between the end of the rod 19 and the lip 48, until the article 10 is resiliently gripped between the opposed jaws 21 and 22 as previously described. This action of the cam 39, together with the coupling between the rod 19 and the jaw 21 which forms a first part of the lost-motion coupling 42, constitutes the jaw-advancing mechanism 26. As the cam 39 begins to recede, the spring 53 partially retracts the rod 19 through the block 53" so that the shelf 17 is withdrawn from beneath the gripped article, while the jaw 21 remains in the advanced, gripping position due to a latching mechanism to be described in detail hereinafter.

With the article 10 resiliently gripped between the jaws 21 and 22 and the shelf 17 withdrawn, the cam 41 actuates the plunger-operating mechanism 35 to lower the plunger 31 and insert the article 10 into the associated article-receiving seat 12. This mechanism 35 includes a first lever 54 pivotably mounted at one end to the support standard 53' by a pin 54', a roller 55 being mounted at the other end of the lever 54 in following engagement with the cam 41. Pivotal movement of the lever 54 in accordance with the intelligence on the cam 41 is transmitted through a spring 56 to one end of a second lever 57, pivotably mounted intermediate its ends also by the pin 54', causing that lever 57 to pivot and to lower the pin 31 pivotably mounted at its other end 57'. Accordingly, the plunger 31 is lowered to slide the article 10 between the opposed parallel surfaces 23 and 24 and to insert the article 10 into the associated receiving seat 12. After the article 10 has been inserted in the seat 12, a spring 58, mounted between the linkage 57 and a supporting arm 59 therefor extending from the standard 53' restores the plunger 31 to its initial position as the cam 41 recedes.

While the plunger 31 is being restored to its initial position, the jaw 21 is retracted through the lost-motion coupling 42. The coupling 42 is partially formed by a key 61 (FIG. 1), which extends into the bore 44 from the enveloping surface of the jaw 21, and is slidably accommodated in a keyway 62 in the rod 19. The length of keyway 62 to the left of the key 47, as viewed in FIG. 1, is calculated to allow the shelf 17 to be withdrawn from beneath the article 10 in preparation for the inserting step while the jaw 21 remains fixed in the gripping position by the latching mechanism which forms the remainder of the coupling 42. After the inserting step has been completed, further rotation of the cam 39 causes further retraction of the rod 19, during which movement the latching mechanism is released and a pair of springs 63—63 (depicted in FIG. 3 as mounted between the standard 34, supporting the plunger 31, and brackets 64—64 fixed on the jaw 21) force the jaw 21 back along the guideway 49 and against a shoulder 65 (FIG. 1) which brings the jaw 21 to rest in the initial position thereof.

Further rotation of the cam 39, beyond the minimum radius region, causes the rod 19 to move to the left to extend the shelf 17 beyond the surface 23 of the jaw 21 to its initial position, so that the next article 10 is received from the chute 11 as shown in FIG. 2. The jaw 21 does not move at this time because the left end of the rod 19 has not yet engaged the lip 48. Therefore, a protrusion 66 (FIG. 3) adjacent to the surface 23 and extending from the end of the jaw 21 in front of and coextensive with the shelf 17 in its extended position provides a stop for the successive articles 10—10 when received on the shelf 17.

The key 61 and the keyway 62 function as part of the lost-motion coupling 42 between the rod 19 and the jaw 21 by allowing relative movement therebetween as the shelf 17 is extended to receive each successive article 10, and as the shelf 17 is withdrawn from beneath the gripped aritcle 10. In addition, the key 61 forms a guide for the keyway 62 so that the upper surfare 16 of the shelf 17 is always horizontal as the rod 19 is advanced and retracted.

The latching mechanism, referred to previously as forming the remainder of the lost-motion coupling 42, includes a latch 67, having a depending portion 68, pivotably mounted on an upright standard 69, extending from the main support 51. The latch 67 is provided for the purpose of holding the jaw 21 in the gripping position until the article 10 has been inserted in the seat 12. A cam follower 71, transversely mounted from the depending portion 68, is aligned directly above the rod 19 and is resiliently urged theretoward by a spring 72 so that it rides on the upper surface of the rod.

As the jaw 21 is advanced with the rod 19 to grip the article 10, the cam follower 71 falls into a groove 73 in the upper surface of the rod 19; consequently, the latch 67 is pivoted downward by the spring 72 and the depending portion 68 is received behind the remote end 74 of the jaw 21, when the jaw 21 reaches the gripping position thereof. Thus, the jaw 21 is locked in that position and remains locked in that position as the shelf 17 is withdrawn from beneath the article 10, the length of the groove 73 being sufficient to permit this limited retracting movement of the rod 15. However, as the rod 19 retracts further, after the article 10 has been inserted into the seat 12, the cam follower 71 is cammed upward and out of the groove 73 to pivot the latch 67 upward and unlatch the jaw 21, thereby permitting the retraction thereof by the springs 63—63 to its initial position and completing the lost-motion coupling 42.

Thus, the combination of the two cams 39 and 41 with the lost-motion coupling 42 establishes the proper sequence of time for (1) advancing the jaw 21 with the shelf 17 to grip the article 10; (2) withdrawing the shelf 17 from beneath the gripped article; (3) lowering the plunger 31 to insert an article 10 in oriented relationship into the associated receiving seat 12; (4) retracting the shelf 17 to its initial position and thereby unlatching the jaw 21 which permits the spring 63 to return the jaw to the initial position thereof; and (5) extending the shelf 17 beyond the surface 23 of the jaw 21 so that the next successive article 10 may be received in oriented relationship on the shelf 17 in preparation for the next inserting operation.

While one specific embodiment of the invention has been described in detail hereinabove, it will be obvious that various modifications may be made from the specific details described without departing from the spirit and scope of the invention.

What is claimed is:

1. Apparatus for inserting a succession of articles in oriented relationship into article-receiving seats in a carrier, which comprises:
    a horizontally movable shelf for receiving and supporting successive articles one at a time, each article in turn being received on an upper surface of said shelf in a properly oriented position relative to an associated article-receiving seat;
    a pair of opposed gripping jaws mounted above said shelf for horizontal movement relatively toward and away from each other, said jaws having opposed parallel gripping surfaces initially spaced apart sufficiently to permit reception of each successive article on said shelf between said jaws;
    means for effecting relative movement of the said jaws toward each other to grip the article in the properly oriented position, yieldably between the opposed parallel gripping surfaces of said jaws;
    means for advancing said shelf with one of said jaws during such relative movement, so that the article remains on said shelf and is gripped between said jaws in vertical alignment above the associated article-receiving seat;
    means for retracting said shelf from beneath the gripped article after the article has been properly positioned by said jaws, so that the article is no longer supported by said shelf and is held solely by said jaws a short distance above the associated article-receiving seat in the properly oriented position relative thereto;
    means for pushing the gripped article downward from between said jaws, which yield so that the article is inserted by said pushing means into the receiving seat, the opposed parallel gripping surfaces of said jaws maintaining the oriented position of the article until the article has been received in the seat to a depth such that misorientation does not thereafter occur; and
    means for returning said shelf and said jaws to their initial positions after each successive article has been inserted into the associated seat in the carrier in preparation for the next inserting operation.

2. The apparatus as recited in claim 1, wherein the article-pushing means comprises a plunger mounted above said jaws in vertical alignment with an article gripped therebetween for vertical movement toward such an article, said plunger having a lower end of mating contour with respect to the upper portions of the gripped article exposed thereto so that the article is accurately accommodated by the lower end of said plunger as said plunger is lowered, whereby the oriented position of the article with respect to a first horizontal axis through the jaws is maintained until the article has been received in the seat to a depth such that misorientation does not thereafter occur, the opposed parallel gripping surfaces of the jaws maintaining the oriented position with respect to a vertical axis through the plunger and with respect to a second horizontal axis perpendicular to the first.

3. Apparatus for inserting a succession of articles in oriented relationship into article-receiving seats in a carrier, which comprises:
    a horizontally movable shelf for receiving and supporting successive articles one at a time, each article in turn being received on an upper surface of said shelf in a properly oriented position relative to an associated article-receiving seat;
    a first jaw mounted above said shelf;
    a second jaw mounted above said shelf for limited horizontal movement relative thereto and for horizontal movement therewith toward and away from said first jaw, said shelf projecting beyond said second jaw and said first and second jaws having opposed parallel gripping surfaces initially spaced apart sufficiently to permit reception of each successive article on said shelf between said jaws;
    means for resiliently urging one of said jaws toward the other;
    means for advancing said second jaw and said shelf with an article thereon toward said first jaw until said second jaw forces the article against said first jaw to depress said resilient means so that the article is yieldably gripped in the proper oriented position and in alignment above the associated article-receiving seat between said jaws while the article is still supported on said shelf;
    means for retracting said shelf from beneath the gripped article after the article has been yieldably gripped and properly positioned, so that the article is no longer supported by said shelf and is held solely by said jaws a short distance above the associated article-receiving seat in the properly oriented position relative thereto;
    means for pushing the gripped article downward from between said jaws, which yield so that the article is inserted by said pushing means into the receiving seat, the opposed parallel gripping surfaces of said jaws maintaining the oriented position of the article until the article has been received in the seat to a depth such that misorientation does not thereafter occur; and
    means for returning said shelf and said jaws to their initial positions after each successive article has been inserted into the associated seat in the carrier in preparation for the next inserting operation.

4. The apparatus as recited in claim 3, wherein the means for advancing the second jaw and the shelf, for retracting the shelf, and for returning the shelf and jaws to their initial positions constitute means for advancing the shelf predetermined distances toward and away from the first jaw, and a lost-motion coupling between the shelf and the second jaw through which the second jaw is advanced and retracted with the shelf after a predetermined limited movement of the shelf alone relative to the second jaw, such that
    (1) the shelf only is advanced at the start of each cycle of operation to extend the shelf a predetermined distance beyond the second jaw to permit reception of an article on the shelf, after which (2) the second jaw is advanced with the shelf through the lost-motion coupling toward the first jaw so that the article on the shelf is yieldably gripped in the properly oriented position between the jaws, after which (3) the shelf only is retracted from beneath the gripped article and the article is thereafter inserted into the associated seat in the carrier by the pushing means, after which (4) the shelf is retracted and the second jaw returned to the initial position of the second jaw in preparation for the next cycle of operation.

5. The apparatus as recited in claim 4,
wherein means are provided for temporarily latching the second jaw in the gripping position so as to prevent any retracting movement of the second jaw with the shelf as the shelf is retracted from beneath the gripped article; and
wherein means are provided, responsive to further retracting movement of the shelf after an article has been inserted into the associated seat in the carrier, for deactuating said latching means to permit the second jaw to retract with the shelf to the initial position of the second jaw.

6. The apparatus as recited in claim 4,
wherein the shelf is formed as a flat projection at a forward end of a cylindrical rod having a cam follower at the rearward end thereof;
wherein a rotary cam is provided which engages the cam follower and has a contour designed to impart the indicated movement to the shelf;
wherein the second jaw is provided with a bore for receiving the rod slidably therein and an internal lip at a forward end which is abutted by the forward end of the rod to couple the second jaw to the shelf when the second jaw is advanced with the shelf; and
wherein a key is mounted on the second jaw so that it extends into the bore, the rod being provided with a keyway of a predetermined length greater than the length of the key for slidably accommodating the key, the length of the keyway being such as to permit the independent movements of the shelf during the article-inserting operation.

7. Apparatus for placing an article in oriented relationship onto a carrier, which comprises:
a horizontally movable shelf for receiving and supporting the article on an upper surface thereof in a properly oriented position relative to the carrier;
a pair of opposed gripping jaws mounted above said shelf for horizontal movement relatively toward and away from each other, said jaws being initially spaced apart sufficiently to permit reception of such article on said shelf between said jaws;
means for effecting relative movement of said jaws toward each other to grip the article yieldably therebetween in a position directly above the carrier;
means for advancing said shelf to a position wherein it may support an article directly above the carrier prior to gripping of the article by said jaws;
means for retracting said shelf from beneath the gripped article so that the article is no longer supported by said shelf and is held solely by said jaws directly above the carrier in the properly oriented position relative thereto; and
means for pushing the article downward from between said jaws, said jaws being yieldable so that the article may be dispensed therefrom and placed by said pushing means onto the carrier, the article-engaging surfaces of said jaws being designed to maintain the oriented position of the article as the article is placed onto the carrier.

References Cited in the file of this patent
UNITED STATES PATENTS

| 2,349,540 | Dolan | May 23, 1944 |
| 2,795,842 | Van Nest et al. | June 18, 1957 |